(12) United States Patent
Zuzarte

(10) Patent No.: US 7,689,553 B2
(45) Date of Patent: Mar. 30, 2010

(54) EXECUTION COST REDUCTION OF SAMPLED QUERIES IN A DATABASE

(75) Inventor: Paul Calisto Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 11/278,107

(22) Filed: Mar. 30, 2006

(65) Prior Publication Data

US 2007/0233648 A1 Oct. 4, 2007

(51) Int. Cl.
G06F 17/30 (2006.01)
G06F 7/00 (2006.01)
(52) U.S. Cl. .............................................. 707/4; 707/5
(58) Field of Classification Search ................. 707/2, 707/3, 4, 5
See application file for complete search history.

(56) References Cited

U.S. PATENT DOCUMENTS 6,519,604 B1 * 2/2003 Acharya et al. ............. 707/102

2004/0128290 A1 * 7/2004 Haas et al. ..................... 707/5

OTHER PUBLICATIONS

"Query Sampling in DB2 Universal Database," Zuzarte, Calisto; Grynz, Jarek; Guo, Junjie; Liu Linqi, SIGMOD Jun. 13-18, 2004, Paris, France.*
"SQL Procedure: the Create Index statement," SAS Institute Inc, Cary, NC 1999, retrieved from http://www.otago.ac.nz/sas/proc/zeateidx.htm on Nov. 7, 2008.*

* cited by examiner

Primary Examiner—James Trujillo
Assistant Examiner—Bruce M. Moser
(74) Attorney, Agent, or Firm—Sughrue Mion, PLLC

(57) ABSTRACT

A method, system and computer program product for reducing the execution cost of sampled queries of tables in a database. A subset of entries comprising row identifiers or key values based on an input query of data in the tables of the database is generated. A sampling predicate to reduce the number of entries in the subset is generated. The sampling predicate is applied to the subset to reduce the number of entries in the subset. The data in the database corresponding to the reduced subset is retrieved from the database.

33 Claims, 3 Drawing Sheets

EXECUTION COST REDUCTION OF SAMPLED QUERIES IN A DATABASE

FIELD OF THE INVENTION

The present invention relates to the field of database sampled queries, and more specifically to a method, program and system for reducing executions costs of sampled queries.

BACKGROUND

A database management system (DBMS) is a computer based system that stores data in tables and retrieves such stored data. Queries are used to obtain data from these tables based on characteristics/parameters set forth in the query. It is often desirable to obtain quick approximate answers to a query from large databases. Sampled queries are one means of obtaining these answers.

Sampled queries are queries performed on sampled tables. A sampled table is the result of randomly selecting a specified number of rows from the table, rather than all rows that match a selection criteria. Sampled queries are used to quickly gather an approximate profile of data within a large table. If a sufficiently large sample size is used, trends in the data can be examined by sampling the data instead of scanning all the data.

For the sampling to be effective from an efficiency point of view, the sampling done early in the query should be considered. However, sampling does not commute with many of the operations in the query. Even for a query of a single relation, sampling may be problematic if the query is more complex.

In a relational model of data, data entries are arranged into columns of values forming one or more multicolumn tables referred to as relations. Relations typically represent an entity, storing attributes of the entity in each record. A join of two relations is a method of combining multiple relations to obtain a consolidated view of the relations. The join may involve matching relevant values of a column of one table with values of a column of a second table. When there are two or more tables in the query, the decision to push the sampling to the access of the base relation in order to reduce the set of rows considered early may be problematic. Many methods, such as, dividing the sampling rate and sampling the individual relations often results in few or no records output. Another approach evaluates the complete join result and then takes the appropriate sample of this result, however, this uses a large number of computing resources to complete join result.

SUMMARY OF INVENTION

A method, computer program product and system for performing or establishing a sampled query of data in tables of a database are provided. A subset of entries consisting of row identifiers of an index of a larger table or key values of an index of a larger table of a database is generated based on an input query and a sampling predicate is generated and applied to the subset to reduce the size of the subset before retrieving data from the table corresponding to the entries of the reduced subset. This proportionally reduces the number of actual rows retrieved from the larger table and reduces the execution cost of the query while maintaining the ability to examine trends in the data. The larger table may for example be a fact table while smaller tables of the query, for example dimension tables, may be joined with a corresponding index of the larger table or incorporated into the query in other manners.

Certain exemplary embodiments can provide a method of establishing a sampled query of tables in a database, the method comprising the steps of a) generating a subset of entries based on a query for data from the tables, the entries representing elements of an index of a larger table from the tables of the query; b) generating a sampling predicate to reduce the number of entries in the subset, the sampling predicate being obtained from the query; c) applying the sampling predicate to the subset to reduce the number of entries in the subset; and d) generating a search of the reduced subset based on the query.

Certain exemplary embodiments can provide a database management system (DBMS) operatively coupled to a data processing system, a computer program product comprising a computer readable medium containing computer executable code for performing a sampled query of tables in a database, the computer program product comprising a) code for generating a subset of entries based on a query for data from the tables, the entries representing elements of an index of a larger table from the tables of the query; b) code for generating a sampling predicate to reduce the number of entries in the subset, the sampling predicate being obtained from the query; c) code for applying the sampling predicate to the subset to reduce the number of entries in the subset; and d) code for generating a search of the reduced subset based on the query.

Certain exemplary embodiments can provide a database management system (DBMS) operatively coupled to a data processing system, a system for performing a sampled query of tables in a database, the system comprising a) a subset generator component for generating a subset of entries based on a query for data from the tables, the entries representing elements of an index of a larger table from the tables of the query; b) a predicate module for generating a sampling predicate to reduce the number of entries in the subset, the sampling predicate being obtained from the query; and c) a sampling predicate applier component for applying the sampling predicate to the subset to reduce the number of entries in the subset.

Certain exemplary embodiments can provide a database management system (DBMS) operatively coupled to a data processing system having memory for storing a database, a method performing a sampled query of tables in a database, the method comprising the steps of a) receiving a query for data from the tables; b) generating a subset of entries based on the query for data from the tables, the entries representing elements of an index of a larger table from the tables of the query; c) generating a sampling predicate to reduce the number of entries in the subset, the sampling predicate being obtained from the query; d) applying the sampling predicate to the subset to reduce the number of entries in the subset; e) generating a search of the reduced subset based on the query; and f) retrieving the data from the database based on the search generated.

BRIEF DESCRIPTION OF THE DRAWINGS

The present invention will be described in conjunction with the drawings in which.

DETAILED DESCRIPTION

The following detailed description of the embodiments does not limit the implementation of the embodiments to any particular computer programming language or database query language. The present invention can be embedded in a computer program product or a propagated signal, which comprises all the respective features enabling the implementation of the methods described herein, and which, when loaded in a computer system, is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form. The computer program product may be implemented in any computer programming language provided that the operating system provides the facilities that support the requirements of the computer program product. The computer program product may for example be implemented in the C or C++ computer programming language, in other computer programming languages in conjunction with C/C++, or in any number of known database languages either alone or in combination with others. Any limitations presented would be a result of a particular type of operating system, computer programming language, or data processing system and would not be a limitation of the embodiment described herein.

Figure 1:
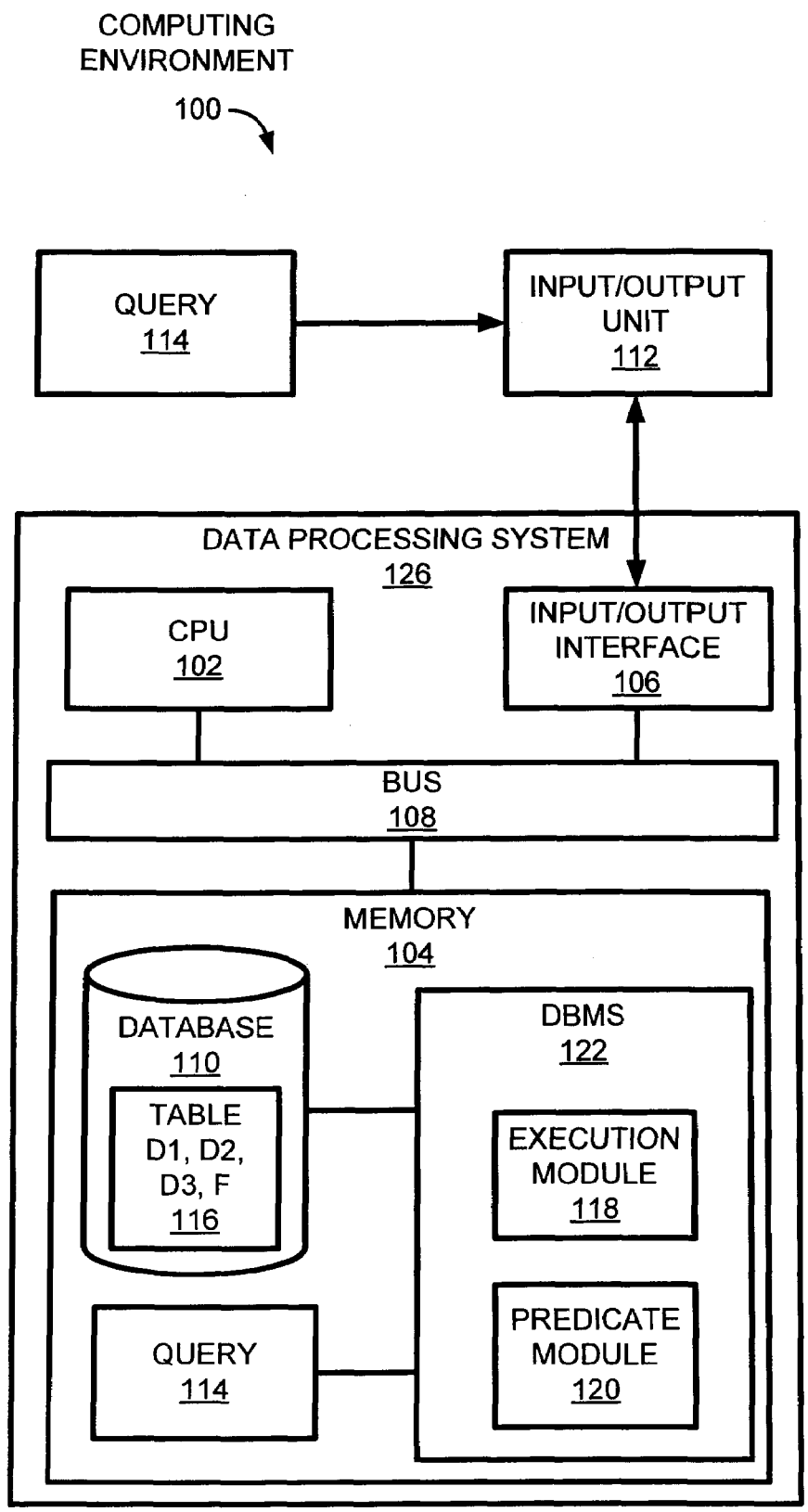
FIG. 1 illustrates an exemplary database management system (DBMS)

FIG. 1 illustrates a configuration of a computing environment 100 comprising a data processing system 126 in which an embodiment of a database management system (DBMS) 122 may be implemented.

The data processing system 126 comprises a central processing unit (CPU) 102, a memory 104, an input/output interface 106 and a bus 108. The CPU 102, the memory 104 and the input/output interface 106 are connected with one another via the bus 108. The input/output interface 106 is configured so that it can be connected to an input/output unit 112 in the computing environment 100.

The CPU 102 can be a commercially available CPU or a customized CPU suitable for operations described herein. Other variations of the CPU 102 can include a plurality of CPUs interconnected to coordinate various operations and functions. The data processing system 126 serves as an apparatus for performing the present method through execution by the CPU 102.

The memory 104 comprises the DBMS 122 and a database 110 with multiple tables 116 that hold information. For example, the database 110 comprises smaller tables D1, D2, D3 and a larger table F. The database 110 may be a relational database and tables D1, D2 and D3 may be dimension tables and table F may be a fact table. However, any table satisfying a referential integrity relationship may be used whereby every value in a column of one table matches one and only one value in the second table.

The DBMS 122 comprises an execution module 118 and a predicate module 120.

The tables 116 may be accessed by a query 114 that is received by the input/output unit 112 and is retained in memory 104 after entry into the data processing system 126. The query 114 may be presented in, for example an SQL format, an XQuery format, etc., that is compiled by the execution module 118 to form an internal representation which is used to generate an execution plan to access the database 110 and the tables 116 therein for extraction of the requested information.

Based on the query 114, a subset of entries of elements of an index of the larger table is generated by the execution module 118. An element is an input in an index of a larger table and corresponds to data in the larger table of the query and includes row identifiers of the index of the larger table and key values of the index of the larger table. In the case of a subset comprising row identifiers, the subset is comprised of an intersection of the row identifiers of rows to be retrieved in the larger table of the query 114. The subset may be generated based on, for example, a "dynamic bit-mapped" star join, a static bit-mapped star join, a "Cartesian" star join, a general query with conditions, or a query with aggregation and grouping on a composite join key wherein a composite join key is a set of columns from the larger table, for example a fact table, that join to different smaller tables, for example dimension tables.

In order to reduce the size of the subset, and thereby reduce the number of rows retrieved from the larger table F, a sampling predicate which filters or reduces the size of the subset, the corresponding data of which is to be retrieved, is applied to the subset. The sampling predicate is generated by the predicate module 120. A sampling rate and/or the sampling predicate may be specified as part of the query as an option global to the query and not tied specifically to a particular table. The sampling predicate may be generated based on the sampling rate which indicates what probability each entry of the subset is likely to be selected or omitted. For example, a sampling rate of 10% may be determined or triggered. Alternatively, a sampling rate of anywhere between 1 to 99% may be selected or input. If the sampling rate is not specified but an approximate answer with reasonable accuracy is required with an allowed time to execute, the specific sampling predicate may be generated based on any number of factors, including, the size of the larger table F, the desired accuracy of the trend based on the retrieved entries of the database, the time allowed, budget, etc.

Any sampling predicate may be used to filter the size of the subset if it provides for all entries of the table(s) to have the same probability of selection and jointly independent inclusion variables. As such, the sampling predicate may be a form of Bernoulli sampling. The Bernoulli sampling may randomly select any number of entries in the subset to be retrieved. For example, the Bernoulli sampling may select between about 5% and about 25% of the entries in the query. An example of a Bernoulli sampling is based on a random generator that, for example provides values between 0 and 1. Using an appropriate filter condition will produce, for example, a 10% probability for selection of each identifier in the subset and therefore a 10% probability of appropriate rows in the larger table being selected. The sampling predicate is applied after any optional appropriate filtering query predicates are applied and before retrieving the corresponding rows of the subset from the larger table and optionally carrying out any non-filtering look up table joins. The optional appropriate filtering query predicates may carry out a preliminary filtering of smaller tables or indexes of the query.

A custom random generator function may also be used which randomly selects or omits entries, i.e. row identifiers or key values, of the subset thereby reducing the size of the subset before retrieval of the corresponding data of the subset in the larger table F. Any reduction of the subset before retrieval of the corresponding data will proportionately reduce the size of the retrieval and reduce the execution cost of the query.

Once the predicate module 120 has generated a sampling predicate or selected a sampling predicate based on the query, the execution module 118 applies the sampling predicate to the subset and may direct retrieval of the corresponding data of the reduced subset. The execution module 118 may complete the sampled query and the result may be returned to the input/output interface 106 and the input/output unit 112.

Dimension and fact tables are used as exemplary tables because join predicates thereof respect a referential integrity relationship. In other words the value of a join column from a row in the fact table exists in the corresponding join column of one and only one row of the dimension table. Referential integrity may be used to achieve a higher quality of sampling. However, other tables may be used which do not satisfy a referential integrity relationship but for which an informational referential constraint might be defined. An informational referential constraint is a constraint that the DBMS 122 does not enforce but that the user declares to be valid. Tables may also be used which contain duplicate values in the join column of the smaller table, provided it can be proved that the range of values of rows used in the query are unique and this range of values could simulate a referential integrity relationship. In one embodiment, there is also a method whereby the tables with filtering predicates need not have referential integrity relationships between them but the sampling predicate may be pushed down to be applied before any look-up tables are considered that do have referential integrity with the table to which they are joined.

By reducing the size of the subset using the sampling predicate, this proportionally reduces the amount of corresponding data, for example the number of actual rows, retrieved from the larger table thereby increasing efficiency of the query and reducing the execution cost. By applying the sampling predicate to the larger table, for example a fact table, after consideration of the smaller tables; for example dimension tables, that filter rows from the fact table, a higher level of precision is achieved compared to distributing the sampling to multiple tables.

Figure 2:
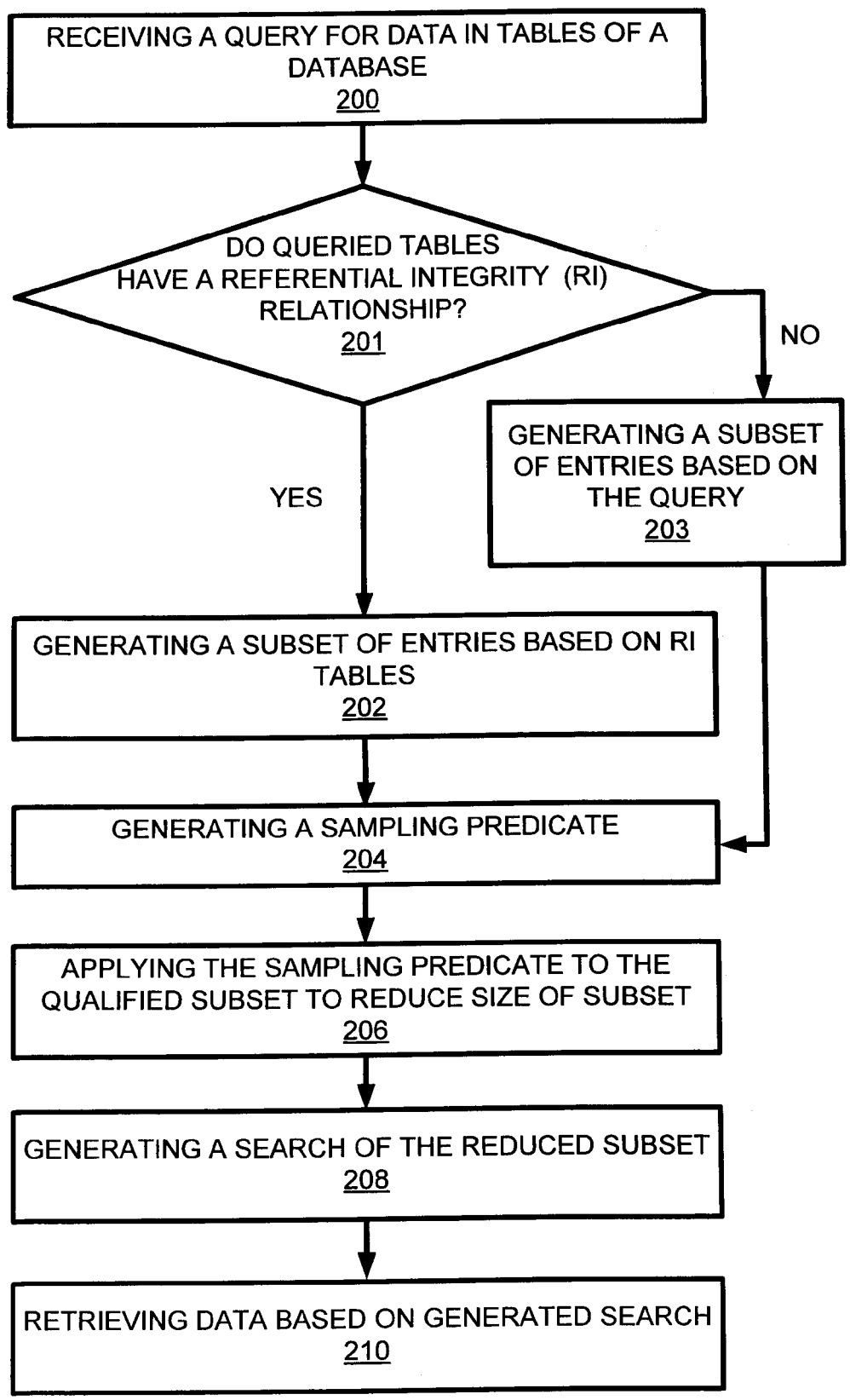
FIG. 2 illustrates operations of the DBMS of FIG. 1 that direct a data processing system to perform a sampled query.

FIG. 2 illustrates operations of the database management system (DBMS) 122 comprising the execution module 118 and the predicate module 120 of FIG. 1 that direct the data processing system 126 to perform a sampled query having reduced execution costs by applying a sampling predicate to a subset of the database before retrieving the corresponding queried information in a larger table of the database 116.

An input query of data in tables of a database is received in step 200. The input query may be any query of data which combines tables or indexes of tables with other tables or indexes of tables of the database 116. For example the input query may comprise a bit mapped star join, a "Cartesian" star join, a general query with conditions, or a query with aggregation and grouping on a composite join key. A subset of entries consisting of row identifiers or key values of an index of a larger queried table is generated in step 203. The subset may be based on tables of the query having a referential integrity relationship which is determined in step 201 and the subset is optionally generated in step 202. The subset may be generated based on for example, a bit mapped star join, a "Cartesian" star join, a general query with conditions, or a query with aggregation and grouping on a composite join key. Examples of each of the above will be illustrated in more detail further below.

A sampling predicate is generated based on the desired query or other characteristics in step 204. As outlined above, any sampling predicate may be used to filter or reduce the size of the subset if it provides for all entries of the table(s) to have the same probability of selection and jointly independent inclusion variables. For example, a form of Bernoulli sampling may be used. A custom random generator function may also be used which randomly selects or omits entries of the subset, be it based on any query including those outlined above.

The sampling predicate is applied to the subset in step 206. Application of the sampling predicate reduces the size of the subset by selecting only a certain number of entries of the subset for retrieval in the larger table F. As a result of the sampling predicate, the subset is reduced and contains fewer entries such as row identifiers or key values. Such reduction therefore proportionately reduces the amount of data corresponding to the reduced subset, for example actual rows, retrieved from the larger table F. A search is generated in step 208 based on the reduced subset following application of the sampling predicate to the subset. Retrieval of the data corresponding to the search from the larger table F in step 210 improves the performance of the sampled query by reducing the number of rows to be retrieved in the larger table thereby at least lowering execution costs. The amount of I/O and CPU time is reduced as a result of fewer identifiers and rows to retrieve as a result of the query. This results in a reduced execution cost and/or reduced I/O and CPU consumption for the sampled query.

As one skilled in the art would be aware, each subset may be generated based on tables and/or corresponding indexes of the database which optionally have filter predicates or equivalents thereof. Furthermore, tables which do not affect the size of the result, for example look-up tables, may be incorporated into the subset or may be added post-retrieval of the rows of the larger table corresponding to the identifiers of the subset. Other typical operations may also be carried out in generating the subset or post retrieval.

Figure 3:
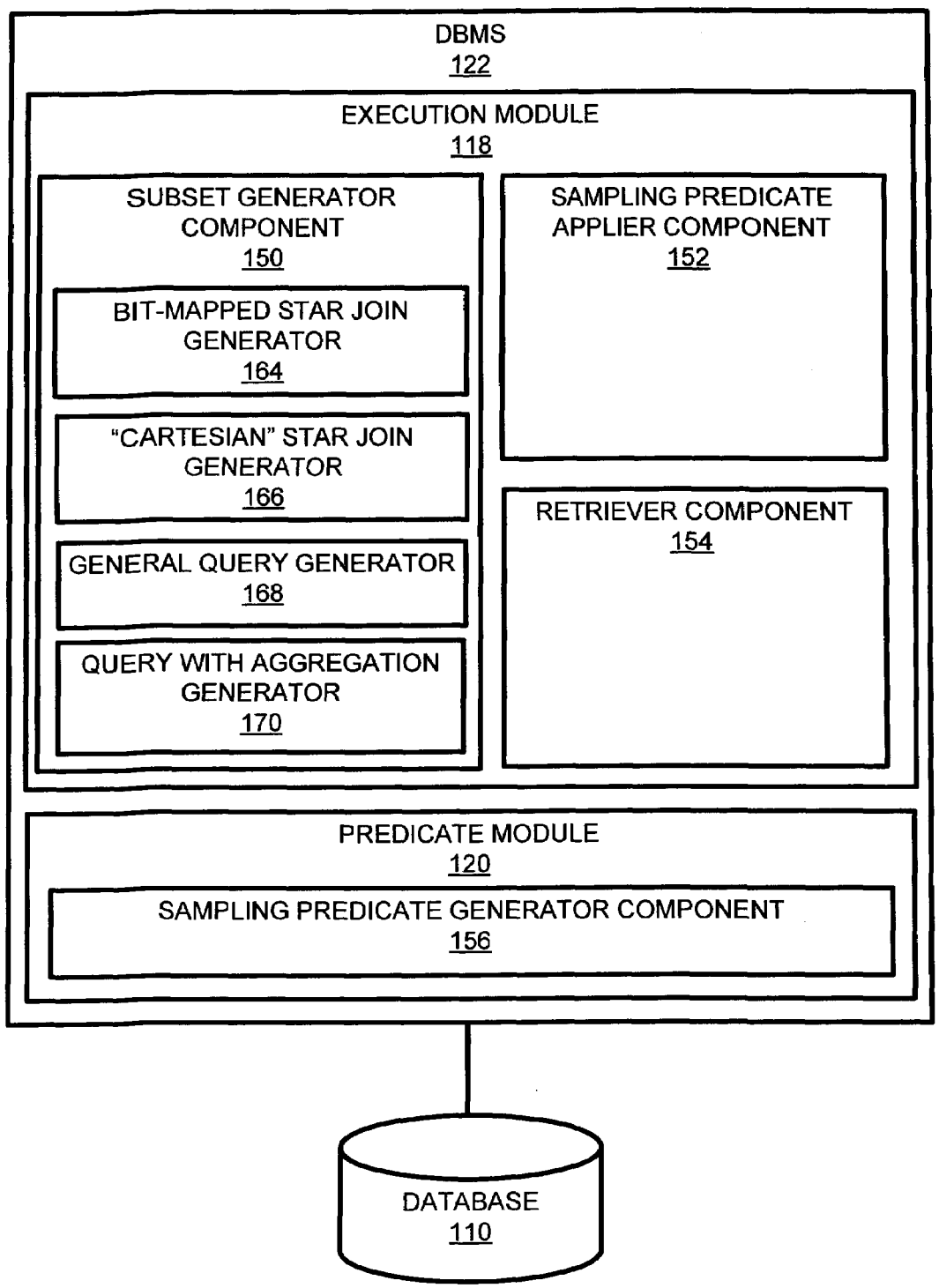
FIG. 3 illustrates exemplary components of the database management system of FIG. 1.

FIG. 3 illustrates the components of the exemplary database management system 122 of FIG. 1. As noted above, the DBMS 122 comprises an execution module 118 and a predicate module 120. The execution module 118 comprises a subset generator 150 for generating a subset of entries consisting of row identifiers or key values of an index of a larger table based on an input query. The entries of the subset correspond to data of a larger queried table of the database 110 to be retrieved. The data may be, for example, rows of the larger table. The predicate module 120 comprises a sampling predicate generator component 156 which is either provided with a sampling predicate or generates a sampling predicate based on, for example the input query. Any sampling predicate may be used to reduce the size of the subset. The sampling predicate is generated or selected based on the input query. The sampling predicate may be a form of Bernoulli sampling or similar filtering through the use of a function like a random generator function. Execution cost is lowered by removing entries from the subset such that fewer corresponding rows are retrieved from the larger table of the database. The sampling predicate is applied to the subset by a sampling predicate applier component 152 of the execution module 118 to filter or reduce the size of the subset. A retriever component 154 retrieves data from the database 110 corresponding to the entries of the reduced subset.

The subset generator 150 of the execution module 118 may further comprise additional subset generators for generating the desired subsets based on a variety of types of input queries. For example, the subset generator 150 may comprises a bit-mapped star join generator 164, a "Cartesian" star join generator 166, a general query generator 168, and/or a query with aggregation generator 170 for generating the desired subset of row identifiers to which the sampling predicate is applied.

As indicated above, the subset may be generated based on, for example, a bit-mapped star join, a "Cartesian" star join, a general query with conditions, or a query with aggregation and grouping on a composite join key or other suitable subset generator.

Bit-Mapped Star Join

An embodiment of a dynamic bit mapped star join includes:

Hashing the row identifier (RID) values for qualifying rows of each fact table index joined to a corresponding dimension table attribute.

Dynamically building a bitmap using hashed RIDs from each index.

Joining bitmaps together using 'AND' logic in a build-and-probe fashion.

Using the last fact table index scan to probe the bitmap and return qualifying RIDs.

Retrieving the qualifying rows from the fact table.

Completing the join with re-joining the dimension tables to pick up column values from the dimension tables.

A join which finds the intersection of row identifiers of a large table such as a fact table in the query may be carried out allowing retrieval of row identifiers, filtered based on cross referencing of desired parameters of various tables or indexes of tables, including smaller tables such as dimension tables and the appropriate indexes of the large table. Provided an input query which joins the fact table F with 3 dimensional tables D1, D2 and optionally D3 stored in a relational database. The tables D1 and D2 have optional filtering predicates p1 and p2, respectively, which apply a filtering function to tables D1 and D2 before they are joined. D3 is a look-up table that does not affect the result size of the join but may add additional information to the records of the result. This can be generalized to more tables in the query having characteristics like D1, D2 and D3.

```
        Join
       / | | \
      F  D1 D2 D3
         p1 p2
```

In this form of star join, filtering dimensions D1 and D2 are joined to the corresponding index on a dimension key column of the fact table. The star join flow is to combine the row identifiers together using a bit map and 'AND' logic to find the intersection of the row identifiers. This constitutes a subset of the rows of the fact table that are the rows of interest. Retrieving these rows from the fact table provides a reduced fact table that could be used for the rest of the query.

An exemplary embodiment is to apply the sampling predicate to further reduce the fact table records by applying the sampling predicate prior to retrieving the data from the fact table. The sampling predicate reduces the subset by selecting various row identifiers of the subset for later retrieval and omitting others in accordance with the sampling predicate. In the diagram below, this filtering is done before sorting the row identifiers to retrieve the values in order as is generally done in a star join. Following the retrieval, the rest of the star join may be processed. The fact table's row identifiers are denoted by RID below. SP stands for sampling predicate. The individual indexes of the fact table that are suitable to the joins with D1 and D2 are denoted IF1 and IF2 respectively.

```
Rejoins + joins to look-up tables if present (D3)
       /
     FETCH
     /    \
  RID-SORT  F
    /
  SP Filter
    |
  RID-ANDing
   / | | \
  D1 IF1 D2 IF2
  p1     p2
```

"Cartesian" Star Join

Cartesian star join will be described by way of an example. A query is provided which asks for details of all sales from a TRANSACTION table, which is the fact table, for customers in a particular ZIP_CODE and buying items from a PRODUCT_GROUP='Electronics". After the relevant rows from a CUSTOMER and PRODUCT tables are Cartesian-joined (i.e. which have no join predicate between them), the result is then joined with the TRANSACTION table's multi-column index on (CUST_ID, PROD_ID). The multi-column index, i.e. an index in which multiple columns are used, allows a user to go directly to the rows and appropriate data pages of the fact table that satisfy join predicates with the dimensions.

In this form of a star join, a sub plan composed of a Cartesian join of two or more dimension tables with local predicates is applied. The Cartesian join is then joined on a composite index, i.e. an index having more that one column, of the fact table that contains the columns corresponding to the dimension keys of the dimension tables. Any remaining tables in the query are look-up dimension tables that do not change the size of the result. An exemplary embodiment is to apply the sampling predicate during the index scan prior to retrieving the data from the fact table.

Consider a similar query as the one in the example for a bit-mapped star join but with a composite index IF instead of individual indexes IF1 and IF2. NLJN denotes a nested loop join.

```
      join the rest of the look-up tables if present
     /
   NLJN
   /   \
 join   FETCH
 / \    /  \
D1  D2 SP   F
p1  p2 IF
```

Here the sampling predicate SP is applied over the row identifiers that satisfy the join predicates from both D1 and D2 applied to the multi-column index IF. This is done before the FETCH from the large table F thereby reducing the rows to be retrieved from F.

General Query with Conditions

A general query with conditions will be illustrated considering a query with the following conditions:

a) one table T1 containing local predicates p1;
b) a large table L1 where with optional local predicates p2 on L1 that together with the join predicate(s) to T1 that can be applied on an index IL1 on L1; and
c) the rest of the tables are look-up joins.

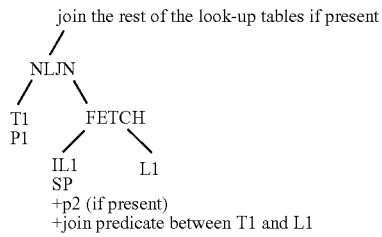

join the rest of the look-up tables if present
/
NLJN
/    \
T1    FETCH
P1    /    \
     IL1    L1
     SP
     +p2 (if present)
     +join predicate between T1 and L1

In the above T1 could be multiple tables with the sub plan of which could be considered as a single entity joining the large table L1. The local predicates p2, if present, and the join predicates between T1 and L1 are applied first on the index IL1 and then the sampling predicate SP is applied before the FETCH of the rows from L1. The set of rows retrieved from L1 is reduced by the sampling predicate. Furthermore, the number of rows required to do the subsequent look-up joins is potentially reduced further saving I/O and CPU consumption.

Query with Aggregation and Grouping on a Composite Join Key

An embodiment of a query with aggregation and grouping on a composite join is illustrated below using the same example as described in the Cartesian join where the query asks for total sales grouped by CUST_ID and PROD_ID so that how much of each product was bought by each customer is returned. The exemplary query may appear as:

```
SELECT CUSTOMER.CUST_ID, PRODUCT.PROD_ID,
SUM(TRANSACTION.SALES)
FROM PRODUCT, CUSTOMER, TRANSACTION WHERE
TRANSACTION.CUST_ID = CUSTOMER.CUST_ID AND
TRANSACTION.PROD_ID = PRODUCT.PROD_ID GROUP BY
CUST_ID,
PROD_ID USE 1% SAMPLE
```

In this scenario there are no local predicates other than the join predicates. Here the DBMS may take the sampling rate and apply it to a multi-column index based on columns (CUST_ID, PROD_ID) on the fact table TRANSACTION picking up ALL the row identifiers that correspond to each (CUST_ID, PROD_ID) combination that was selected by the sampling predicate.

In other words, the sampling predicate is applied on the key values in the index and not to the individual row identifiers of the index.

If there are local predicates, this embodiment could be considered similar to the Cartesian star join embodiment where the sampling predicate is applied after all the tables involving local predicates are first joined. However, note that here because the sampling is required on the combination of CUST_ID and PROD_ID values, the sampling predicate is applied to the CUST_ID, PROD_ID key values and not to the row identifiers.

A further embodiment may also be extended to the DISTINCT construct in SQL that in some ways is similar to the GROUP BY CUST_ID, PROD_ID when there is no aggregation.

For example:

```
SELECT DISTINCT CUST_ID, PROD_ID
FROM PRODUCT, CUSTOMER, TRANSACTION
WHERE TRANSACTION.CUST_ID = CUSTOMER.CUST_ID AND
TRANSACTION.PROD_ID = PRODUCT.PROD_ID
USE 1% SAMPLE
```

In addition to the examples above, one could have what are called snowflakes in literature where instead of the single dimension table D1 as shown in the example under the bit-mapped star join description, the query could have a hierarchy of dimension tables, or alternatively, any other table joined amongst themselves but with only one of them being joined to the fact table.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, as mentioned earlier, the invention can take the form of a computer program product. The computer program product is accessible from a computer-usable or computer-readable medium providing program code for use by or in connection with a computer or any instruction execution system. For the purposes of this description, a computer-usable or computer readable medium can be any apparatus that can contain, store, communicate, or transport the program for use by or in connection with the instruction execution system, apparatus, or device.

The medium can be an electronic, magnetic, optical, electromagnetic, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

As illustrated earlier, a data processing system suitable for storing and/or executing program code will include at least one processor coupled directly or indirectly to memory elements, possibly through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and ethernet cards are just a few of the currently available types of network adapters.

It is apparent to one skilled in the art that numerous modifications and departures from the specific embodiments described herein may be made without departing from the spirit and scope of the invention.

I claim:

1. A method of establishing a sampled query of tables in a database, the method comprising:
    a) receiving a query referencing a fact table and at least one other joined table in the database stored in a computer-readable medium, a sampling specification for the query, and an index on fact table keys of the fact table;
    b) generating, using the index, a subset of records of the fact table keys after receiving the query, wherein the index includes keys of the at least one other joined table;
    c) generating, based on the received sampling specification for the query, a sampling predicate to sample the generated subset of the fact table keys;
    d) sampling, based on the generated sampling predicate, the generated subset to obtain a sampled subset;
    e) retrieving selected records from the at least one other joined table, which records correspond to records of the sampled subset of the fact table keys; and
    f) executing, using a processor, the query based on the sampled subset and the selected records from the at least one other joined table.

2. The method of claim 1, wherein in step b) the records of the subset are selected from a group consisting of row identifiers of the index and key values of the index of the fact table.

3. The method of claim 1, wherein step c) comprises:
    generating the sampling predicate using Bernoulli sampling.

4. The method of claim 1, wherein step c) comprises:
    generating the sampling predicate using a random generator function.

5. The method of claim 1, wherein step b) comprises:
    determining tables in the database having a referential integrity relationship, wherein the determined tables are used to generate the subset.

6. The method of claim 1, wherein step c) comprises:
    generating the sampling predicate to reduce the number of records in the subset based on a sampling rate of the generated subset.

7. The method of claim 1, wherein step c) comprises:
    generating the sampling predicate such that 5% to 25% of the records of the generated subset remain in the sampled subset after the sampling predicate is applied to the generated subset in step d).

8. The method of claim 1, wherein step b) comprises:
    generating the subset based on a bit-mapped star join of at least two dimension tables referenced in the query and indexes corresponding to a dimension key column of the fact table.

9. The method of claim 1, wherein step b) comprises:
    generating the subset based on a composite index of the fact table, wherein the fact table is used in a Cartesian star join of at least two dimension tables referenced in the query, the at least two dimension tables being joined to the fact table on the composite index containing columns corresponding to dimension keys of the fact table.

10. The method of claim 1, wherein step b) comprises:
    generating the subset based on the query with grouping on a composite join key.

11. The method of claim 1, further comprising:
    performing non-filtering look-up table joins after step d).

12. The method according to claim 1, wherein step a) further comprises receiving an aggregation requirement, and the method further comprises computing an aggregation based on the aggregation requirement and the sampled subset of the fact table keys after step d).

13. A computer readable storage medium storing a program to execute functions of a method for establishing a sampled query of tables in a database, the functions comprising:
    a) receiving a query referencing a fact table and at least one other joined table in the database, a sampling specification for the query, and an index on fact table keys of the fact table;
    b) generating, using the index, a subset of records of the fact table keys after receiving the query, wherein the index includes keys of the at least one other joined table;
    c) generating, based on the received sampling specification for the query, a sampling predicate to sample the generated subset of the fact table keys;
    d) sampling, based on the generated sampling predicate, the generated subset to obtain a sampled subset;
    e) retrieving selected records from the at least one other joined table, which records correspond to records of the sampled subset of the fact table keys; and
    f) executing the query based on the sampled subset and the selected records from the at least one other joined table.

14. The computer program product of claim 13, wherein in step b) the records of the subset are selected from a group consisting of row identifiers of the index and key values of the index of the fact table.

15. The computer program product of claim 13, wherein step c) comprises:
    generating the sampling predicate using Bernoulli sampling.

16. The computer program product of claim 13, wherein step c) comprises:
    code for generating the sampling predicate using a random generator function.

17. The computer program product of claim 13, wherein step b) comprises:
    determining tables in the database having a referential integrity relationship, wherein the determined tables are used to generate the subset.

18. The computer program product of claim 13, wherein step c) comprises:
    generating the sampling predicate to reduce the number of records in the subset based on a sampling rate of the generated subset.

19. The computer program product of claim 13, wherein step c) comprises:
    generating the sampling predicate such that 5% to 25% of the records in the generated subset remain in the sampled subset in response to the application of the sampling predicate to the generated subset.

20. The computer program product of claim 13, wherein step b) comprises:
    generating the subset based on a bit-mapped star join of at least two dimension tables references in the query and indexes corresponding to a dimension key column of the fact table.

21. The computer program product of claim 13, wherein step b) comprises:
    generating the subset based on a composite index of the fact table, wherein the fact table is used in a Cartesian star join of at least two dimension tables references in the query, the at least two dimension tables being joined to the fact table on the composite index containing columns corresponding to dimension keys of the fact table.

22. The computer program product of claim 13, wherein step b) comprises:
    code for generating the subset based on the query with grouping on a composite join key.

23. The computer readable storage medium of claim 13, wherein step a) further comprises receiving an aggregation requirement, and the functions further comprise computing an aggregation based on the aggregation requirement and the sampled subset of the fact table keys after step d).

24. A data processing system for performing a sampled query of tables in a database, the system comprising:
- a processor which receives a query referencing a fact table and at least one other joined table in the database, a sampling specification for the query, and an index on fact table keys of the fact table;
- a subset generator which generates, using the index, a subset of records of the fact table keys after receiving the query, wherein the index includes keys of the at least one other joined table;
- a predicate generator which generates, based on the received sampling specification for the query, a sampling predicate to sample the generated subset of the fact table keys;
- a sampling predicate applier which samples, based on the generated sampling predicate, the generated subset to obtain a sampled subset, wherein the processor retrieves selected records from the at least one other joined table, which records correspond to records of the sampled subset of the fact table keys; and
- a query processor which executes the query based on the sampled subset and the selected records from the at least one other joined table.

25. The system of claim 24, wherein the records of the subset are selected from a group consisting of row identifiers of the index and key values of the index of the fact table.

26. The system of claim 24, wherein the sampling predicate is selected from a group consisting of: a form of Bernoulli sampling and a random generator function.

27. The system of claim 24, wherein tables in the database having a referential integrity relationship are determined, wherein the determined tables are used to generate the subset.

28. The system of claim 24, wherein the predicate generator generates the sampling predicate to reduce the number of records in the subset based on a sampling rate of the generated subset.

29. The system of claim 24, wherein the sampling predicate is generated such that 5% to 25% of the records in the generated subset remain in the sampled subset after the sampling predicate is applied to the generated subset.

30. The system of claim 24, wherein the subset generator comprises a bit-mapped star join generator for generating the subset based on a bit-mapped star join of at least a dimension table and a dimension key column of the fact table.

31. The system of claim 24, wherein the subset generator comprises a Cartesian star join generator for generating the subset based on a composite index of the fact table, wherein the fact table is used in a Cartesian star join of at least two dimension tables referenced in the query, the at least two dimension tables being joined to the fact table on the composite index containing columns corresponding to dimension keys of the fact table.

32. The system of claim 24, wherein the subset generator comprises a query with aggregation generator for generating the subset based on the query with grouping on a composite join key.

33. The data processing system of claim 24, wherein the processor receives an aggregation requirement along with the query, and the processor computes an aggregation based on the aggregation requirement and the sampled subset of the fact table keys after the sampling predicate applier samples, based on the generated sampling predicate, the generated subset to obtain the sampled subset.

* * * * *

UNITED STATES PATENT AND TRADEMARK OFFICE
CERTIFICATE OF CORRECTION

PATENT NO. : 7,689,553 B2  Page 1 of 1
APPLICATION NO. : 11/278107
DATED : March 30, 2010
INVENTOR(S) : Calisto Paul Zuzarte It is certified that error appears in the above-identified patent and that said Letters Patent is hereby corrected as shown below:

On the title page:

Item (75) for the inventor's name currently reads:

(75) Inventor: Paul Calisto Zuzarte, Pickering (CA)

and should read:

(75) Inventor: Calisto Paul Zuzarte, Pickering (CA)

Signed and Sealed this

Tenth Day of August, 2010

David J. Kappos
*Director of the United States Patent and Trademark Office*